United States Patent [19]

Choquet et al.

[11] 4,137,427
[45] Jan. 30, 1979

[54] SYNCHRONIZING DEVICE FOR THE RECEIVER CLOCK OF A DATA TRANSMISSION SYSTEM USING PSK MODULATION

[75] Inventors: Michel Choquet, Vence; Daniel Pilost; André Vadé, both of St-Laurent-du-Var, all of France

[73] Assignee: International Business Machines Corporation, Armonk, N.Y.

[21] Appl. No.: 812,971

[22] Filed: Jul. 5, 1977

[30] Foreign Application Priority Data

Jul. 9, 1976 [FR] France .................. 76 21564

[51] Int. Cl.² .................................. H04L 7/00
[52] U.S. Cl. .................................... 178/69.1; 328/155
[58] Field of Search ................... 178/69.1, 88, 531; 325/60, 63, 321, 418, 419, 420, 423; 328/72, 74, 133, 155

[56] References Cited

U.S. PATENT DOCUMENTS

| 3,825,737 | 7/1974 | Croisier | 235/186 |
| 4,039,748 | 8/1977 | Caron et al. | 178/69.1 |

OTHER PUBLICATIONS

Bennett, W.R. and Davey, S.R., Data Transmission, New York, McGraw-Hill, 1965, Chapter 10.

Principles of Data Communications, Lucky, et al., McGraw-Hill, 1968, Chapter 9.

"The Cordic Trigonometric Computing Technique" IRE Transactions on Electronic Computers, Sept. 1959, pp. 330–334.

Primary Examiner—Robert L. Griffin
Assistant Examiner—Michael A. Masinick
Attorney, Agent, or Firm—John B. Frisone

[57] ABSTRACT

This invention relates to a new clock synchronizing arrangement for use in the receiving device of a data transmission system employing PSK modulation.

In PSK systems, the received signal x(t), for a given carrier angular frequency $\omega_c$ can be defined by its envelope and its phase r (t) and $\phi$(t), respectively. r(t) and $\phi$(t) can be expressed by:

$$r(t) = \sqrt{x^2(t) + \hat{x}^2(t)} \text{ and } \phi(t) = \arctan \hat{x}(t)/x(t)$$

where $\hat{x}(t)$ is the Hilbert Transform of x(t).

At the optimum signalling instant $t_{opt}$, $r(t_{opt})$ and $\phi(t_{opt})$ normalized (without the data) exhibit the minimum variance. The clock adjustment signal is derived from the variance of the envelope or the variance of the phase of the received signal.

13 Claims, 8 Drawing Figures

SYNCHRONIZING DEVICE FOR THE RECEIVER CLOCK OF A DATA TRANSMISSION SYSTEM USING PSK MODULATION

This invention relates to synchronous data transmission systems and, more particularly, to a process for synchronizing the clock of the receiver in a data transmission system using phase shift keying modulation also called PSK modulation. Also, this invention relates to the device provided for adjusting the decoding clock in a receiver embodying this process.

PSK modulation is described in the books entitled, "Data Transmission" by W. R. Bennett and S. R. Davey, Chapter 10, published by McGraw-Hill, New York 1965 and "Principles of Data Communications" by R. W. Lucky, J. Salz and E. J. Weldon, Jr., Chapter 9, published by McGraw-Hill, New York 1968. It is desirable to refer to these books for a more detailed description of this technique which will, however, be briefly described in the following.

In digital data transmission systems using PSK modulation, the digital data to be transmitted are used to control the phase of a carrier signal to have a desired phase at discrete instants called "signaling instants." There are two types of PSK modulation: the so-called coherent modulation (CPSK) and the so-called differential modulation (DPSK).

In CPSK modulation, each absolute value of the phase of the carrier signal is made to correspond to one of a group of data bits or a specific character.

In DPSK modulation, each of a number of phase variations with respect to the phase sent for the preceding character is made to correspond to one of a group of data bits or to a given character. The number of absolute values of phase or the number of phase variations used for encoding depends on the number of bits used for specifying the character. For encoding a character with l bits, $2^l$ absolute values of phase or phase variations are necessary.

The carrier signal as modulated in the emitter of the transmission system is carried to a receiver through a transmission channel. The value of the phase of the signal received at the point in the received signal which corresponds to the signaling instants as transmitted and which points are defined by a local clock, is detected in the receiver and the value of the transmitted data is deduced from it.

Therefore, in order to have the data correctly detected, it is imperative that the signaling instants defined by the local clock in the receiver coincide with the instants in the signal at which the transmitted carrier had been modulated to the desired phase. For this purpose, the receiver is to be provided with a clock signal generator whose frequency and phase can be adjusted so that the instants at which the data are detected in the receiver coincide with the signaling instants of the carrier signal.

This adjustment of the clock signal generator which will subsequently be called a "synchronizing operation," can be performed in a plurality of ways.

One of the ways which may be followed to carry out the synchronizing operation consists in choosing the frequency of the receiver clock signal as close as possible to a multiple of the signaling rate 1/T expressed in Bauds and used at the transmitter to define the data transmission rate, and then in carrying out an accurate adjustment of the clock signal frequency and phase by using signals transmitted before and during the transmission of the data. The adjustment is performed in several steps. First of all, prior to the first data transmission, the system is initiated and the phase of the clock signal generator is preset. Then, prior to every transmission, the phase of the clock signal generator with respect to the carrier signal is readjusted to an initial value. And, finally, successive corrections are performed on the clock during each transmission according to information extracted from the received signals.

For synchronizing the clock during the transmission, the control information allowing the correction of the phase of the clock signal is derived from a signal which is superposed on the transmitted signal which is carrying the data. This synchronizing system has the disadvantage of introducing noise (non-data carrying signals) into the transmission channel.

Another system is described in French Patent application No. 75 14020 filed by the assignee of the present invention in France on Apr. 25, 1975, and corresponding to U.S. Pat. No. 4,039,748, issued on Aug. 2, 1977, to Caron et al and entitled, "Method and Device for Synchronizing the Clock of the Receiver in a Data Transmission System." This scheme consists in deriving the control information required for adjusting the phase of the clock signals in the receiver directly from the received signal. For this purpose, the received signal is filtered to obtain a first signal of frequency $f_1 = f_c - \frac{1}{2}T$ and of phase $\phi 1$ and a second signal of frequency $f_2 = f_c + \frac{1}{2}T$ and of phase $\phi 2$, $f_c$ being the carrier frequency and 1/T, the signaling rate expressed in Bauds. Then, both signals are combined to obtain an error signal which is indicative of the phase variation $\phi 1 - \phi 2$ and the error signal is used as a control signal to adjust the phase of the receiver clock to reduce the phase variation $\phi 1 - \phi 2$ to a minimum.

Such an embodiment of a clock adjusting scheme requires several filters and consequently, a large amount of computing power when using digital filters. This raises the cost of an embodiment with such a large computer power to a point which is, at times, hardly justifiable.

For some less demanding applications, simpler and cheaper types of clock synchronizing systems can be used.

It is then a main object of this invention to provide a process and a device for controlling the adjustment of the phase of the clock signals in the receiver of a data transmission system using PSK modulation.

Another object of this invention is to provide such a control device in which the phase control information is derived from the data-carrying signal received by the receiver.

A further object of this invention is to provide such a device which has good performance even when the transmission channel introduces heavy distortions in the transmitted signal.

Another object of this invention is to provide a lower cost device which has satisfactory performance characteristics.

The fundamental procedure of this invention is to use the properties of the characteristic parameters of the signal received by the receiver of a transmission system using PSK modulation.

In effect, the received signal is a time varying function, two parameters of which have constant values at the signaling instants. These parameters are the envelope of the signal and its nominal phase which has been modulated by the data. Therefore, at every signaling instant, the envelope and the nominal phase separated from the data, show a minimum variance.

This property is used in the process of this invention to generate a control signal which is utilized to adjust the phase of the signals provided by the receiver clock.

The process of this invention is performed in three steps. In the first step, variations $\delta X_1$ of a selected one of the characteristic parameters (nominal phase or envelope) of the signal received at instants $t_1 = t_s - \tau$; $t_s$ being the approximate signaling instant fixed at the reception by the clock and $\tau$ being a given time interval, are measured. In the second step, a second set of variations $\delta X_2$ of the same characteristic parameter are measured at instants $t_2 = t_s + \tau$. In a third step, the control signal $\epsilon$ is derived from variations $\delta X_1$ and $\delta X_2$, in accordance with the equation:

$$\epsilon = \overline{(\delta X_2)^2 - (\delta X_1)^2}$$

This control signal is applied to the clock to vary the phase of the signals delivered by said clock until $\epsilon$ is substantially null.

The foregoing and other objects, features and advantages of the invention will be apparent from the following more particular description of a preferred embodiment of the invention, as illustrated in the accompanying drawings.

FIG. 1 shows the major elements of a first embodiment of a data receiver.

FIGS. 2a and 2b schematically show the variations with time of the quantity $\delta r^2(t)$ for a transmission without and with signal distortion respectively.

Figure 3:
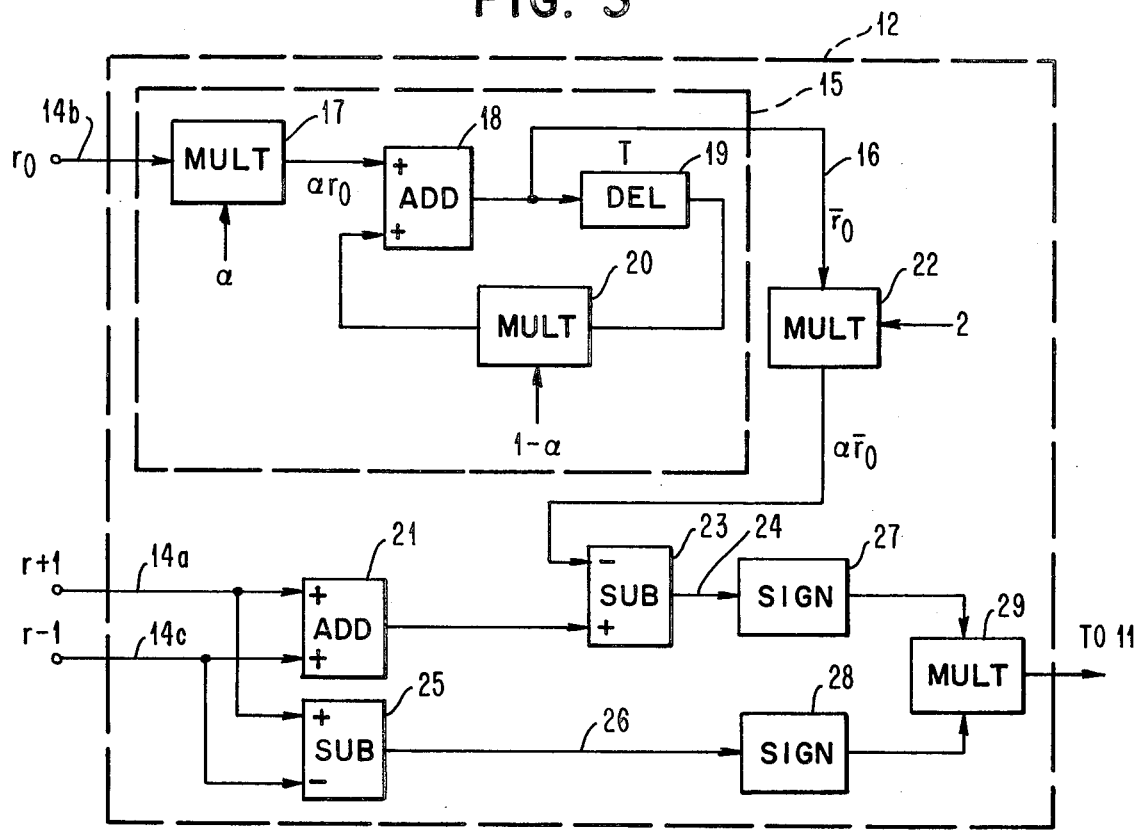
FIG. 3 is a detailed representation of a first embodiment of the adjusting circuit 12 of FIG. 1.
Figure 4:
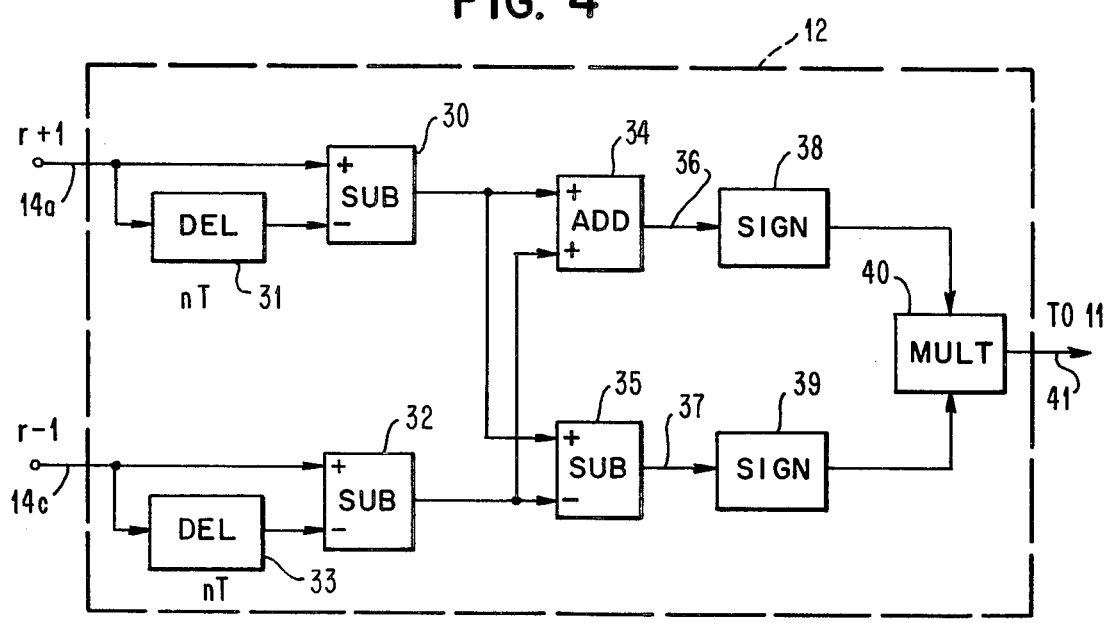
FIG. 4 is a detailed representation of a second embodiment of the adjusting circuit 12 of FIG. 1.
Figure 6:
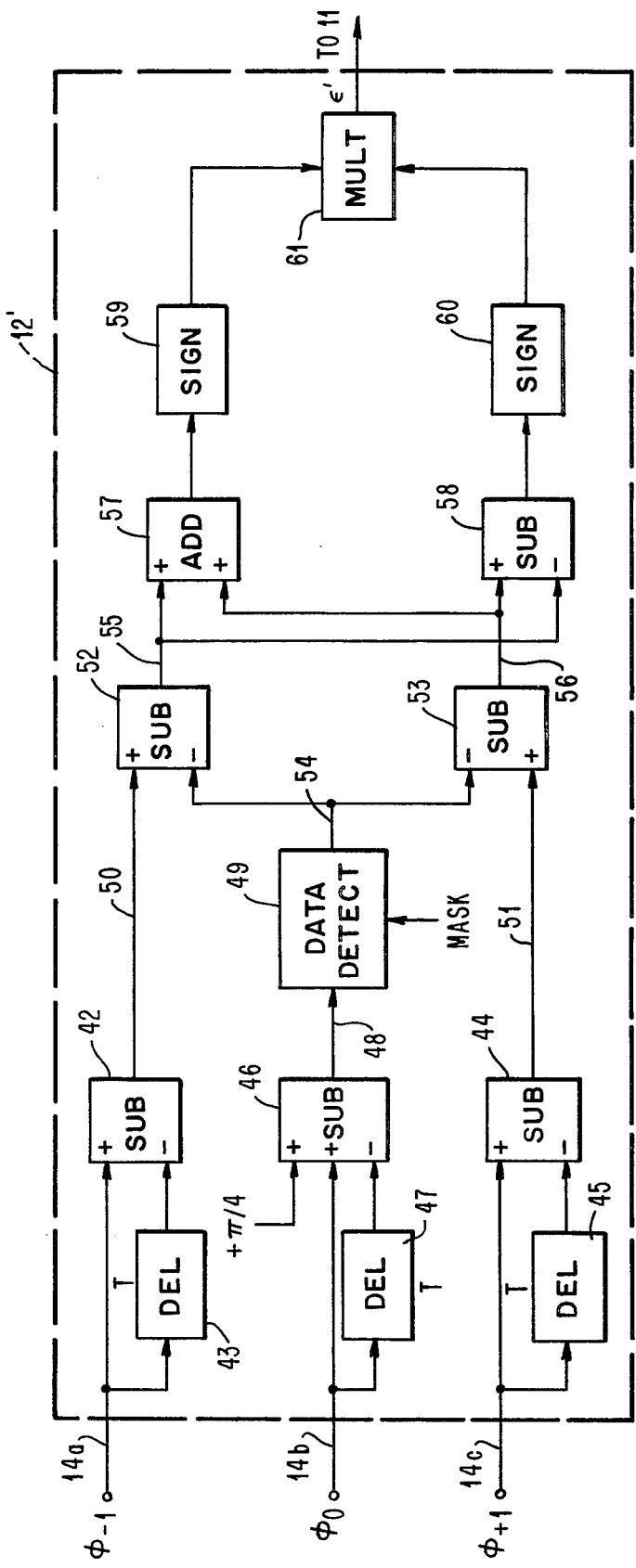
FIG. 6 is a detailed representation of the adjusting circuit 12' of FIG. 5.
Figure 7:
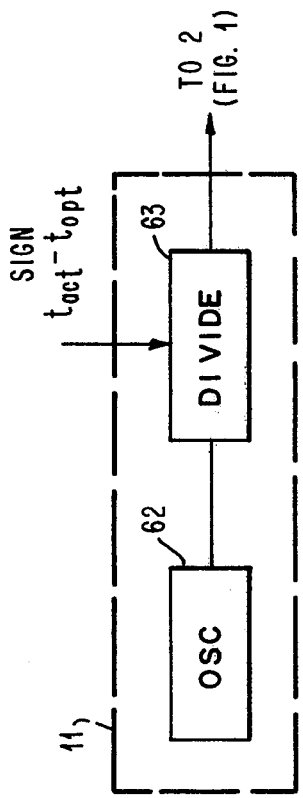

FIG. 7 schematically shows an oscillator controllable by the adjusting signals provided by the circuits of FIGS. 3, 4 or 6.

In accordance with this invention, the receiver of a system for transmitting data in PSK modulation includes a clock signal generator controllable for variable frequency and/or variable phase and a control device generating the following control signal:

$$\epsilon = \overline{(\delta X_{+1})^2 - (\delta X_{-1})^2}$$

from the received signal. The $\epsilon$ signal is obtained by processing the values of a parameter X of the two signal samples received at instants $t_{act} + \tau$ and $t_{act} - \tau$, i.e., signal samples $X_{+1}$ and $X_{-1}$. Said signal $\epsilon$ is applied to the clock signal generator to vary its frequency and/or phase in a direction to minimize $\epsilon$.

Several embodiments of this invention will be described. In a first embodiment, parameter X is selected as the signal envelope and in a second embodiment, parameter X is selected as the nominal signal phase.

Figure 1:
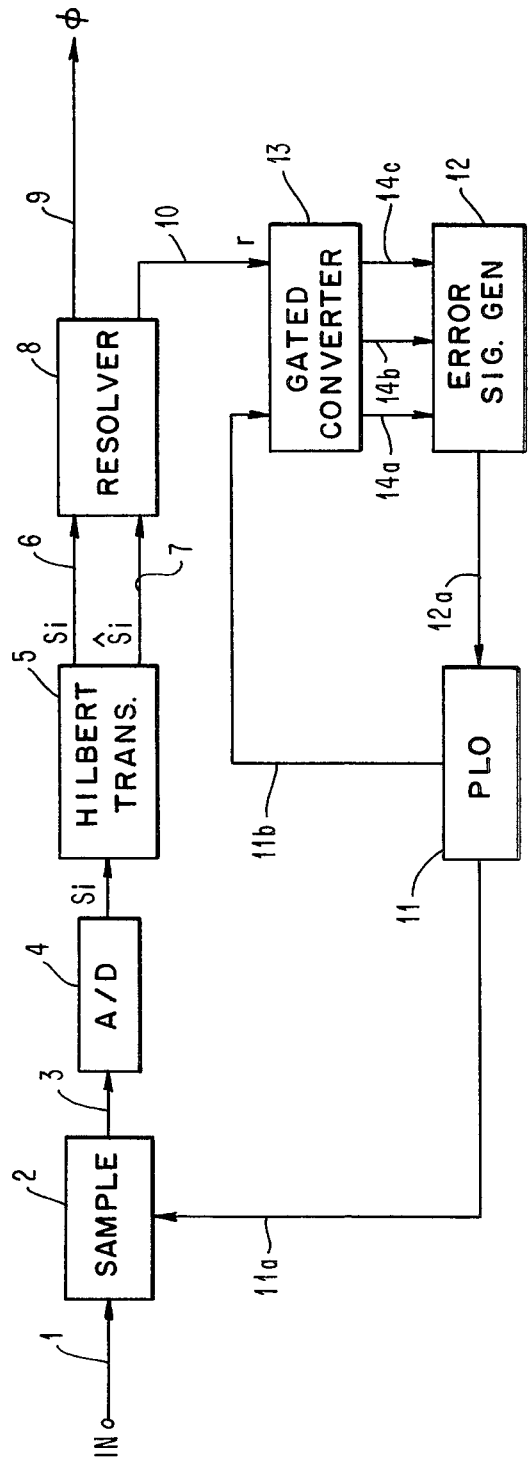

The data receiver shown on FIG. 1 includes a device processing the received signal envelope according to the process of this invention. In effect, when the data are transmitted over a transmission carrier in PSK modulation, the envelope of the signal received by the transmission system receiver has a constant amplitude value at the signaling instants, which are separated by a period T.

The major elements of a receiver which are required to implement the process of this invention, are shown in FIG. 1.

This receiver includes an input 1 receiving the digital data carrier signal transmitted over the transmission channel by an emitter (not shown) using the PSK modulation technique to encode the data. The receiver function consists in retrieving the digital data from the signal it receives. For this purpose, the signal received on line 1 is applied to a sampling circuit 2 which delivers on its output line 3, the amplitude values of samples of the input signal sampled at a frequency $1/\tau$ which, in this case, is a multiple $m/T$ of the signalling rate. The analog values of these samples are converted into digital values in an analog-to-digital converting circuit 4.

The digital values of the samples are applied to a Hilbert transformer 5 which provides at output 6, samples $s_i$ of the input signal and at output 7, samples $\hat{s}_i$ of the input signal after a Hilbert transformation.

Samples $s_i$ and $\hat{s}_i$ are applied to a resolver 8 which derives from the digital values of both samples $s_i$ and $\hat{s}_i$, the phase $\phi$ and the amplitude or envelope r values for each sampling time, on output lines 9 and 10, respectively. Circuits 2, 4, 5 and 8 are conventional and need not be further described here. For the description of a resolver, it is desirable to refer to the article of J. E. Volder published in "IRE Transactions on Electronic Computers," September 1959, pages 330-334 and entitled: "The Cordic Trigonometric Computing Technique." Another technique for obtaining the phase of the signal is described in assignee's French Pat. No. 71 47850 filed on Dec. 21, 1971, and corresponding to U.S. Pat. No. 3,825,737, issued to Alain Croisier on July 23, 1974, and entitled, "Digital Phase Detector."

The sampling instants in sampler 2 are controlled by a phase locking oscillator 11 providing at its output 11a, a sampling signal having a frequency $1/\tau$ and a controlled phase. The analog or digital circuits for this function are well known. In general, the phase locking oscillator includes a crystal oscillator providing a sine signal at a high frequency. This signal is squared and applied to a divider chain providing the sampling pulses at the required frequency. By varying the division ratios, the output frequency and phase of the sampling pulse can be varied.

It will be assumed that prior to transmission of a message a known data pattern is sent so that the clock may be roughly adjusted to the signaling instants at which the data signal is to be sampled. This operation can be performed by measuring the eye pattern of the incoming signals and by then correcting the clock phase so that the opening of the eye of the pattern is at a maximum.

The later continuous phase adjustment of the clock signal generator 11 during a message transmission is performed under the control of an error signal generated on line 12a by generator circuit 12. Through a circuit 13 including a gate which is opened during three sampling times, one on each side of the central sample in each signaling instant, and a series-parallel converting circuit, circuit 12 receives three samples of the envelope of the received signal close to each signaling instant and derives the error signal. The gate of circuit 13 is opened by a signal on line 11b, obtained by counting the clock pulses in PLO 11.

Two embodiments of circuits 12 will be described in detail with reference to FIGS. 3 and 4.

Before proceeding to a particular description of circuit 12, it will be shown how the error signal can be obtained by processing the data for the signal envelope.

The line signal transmitted in PSK modulation is defined by two components in quadrature.

$$x(t) = \sum_k s_0(t - kT + t_0) \times \cos(2\pi f_c t + \phi_k + \phi_0) \quad (1)$$

and $$\hat{x}(t) = \sum_k s_0(t - kT + t_0) \times \sin(2\pi f_c t + \phi_k + \phi_0) \quad (2)$$

where
k is an integer
$f_c$ is the carrier frequency
$1/T$ is the signaling frequency
$t_0$ is the time origin
$\phi_0$ is the initial phase
$s_0(t)$ is the base band signal element
so that $s_0(kT) = 1$.

The amplitude $r(t)$ of the signal envelope is equal to:

$$r(t) = \sqrt{x^2(t) + \hat{x}^2(t)} \quad (3)$$

and, therefore $r(t)$ is a function of time. However, at the optimum signaling instants $t_{opt}$, $x(t)$ and $\hat{x}(t)$ show a minimum inter-symbol interference and consequently, the envelope shows fixed points where the variance of $r(t)$ is null.

At the optimum signaling instants $t_{opt}$, the variance of $r(t)$ is at a minimum, which can be written as follows: mean value of $\delta^2 r(t)$ at instant $t_{opt}$(modulo T)

$$\text{i.e. } \overline{\delta^2 r(t_{opt})} = \text{minimum} \quad (4)$$

where $\delta r(t)$ is the variance of the envelope.

Figure 2A:
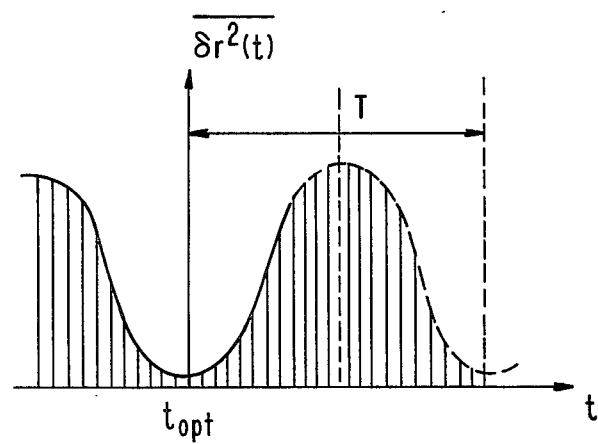
Figure 2B:
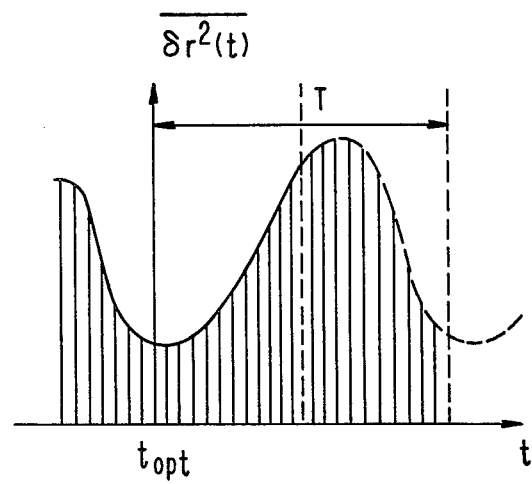

It is to be noted that $\overline{\delta^2 r(t)}$ is a periodic function of the period T and has a maximum in the middle of interval $[t_{opt}, t_{opt} + T]$ as shown on FIG. 2a in the case of a transmission without distortion and near the middle for a transmission with distortion as indicated in FIG. 2b.

At each signaling instant $(t_{act})$ as defined by the receiver clock, the variance is measured by processing the two samples separated by $\tau$ from the sample $r(t_{act})$, one sample before $t_{act}$ and one after. These two samples are designated $r_{+1}$ and $r_{-1}$ and the central sample taken at $t_{act}$ is designated $r_O$.

This measurement will be integrated over several signaling periods and the clock phase will be altered so that the variance becomes a minimum at which time the received signal will be properly sampled at a time coinciding with a signaling instant as received at the receiver.

Therefore, circuit 12 computes the terms:

$$\overline{(\delta r_{+1})^2} - \overline{(\delta r_{-1})^2} = \epsilon \quad (5)$$

or $$\overline{(\delta r_{+1})^2 - (\delta r_{-1})^2} = \epsilon \quad (6)$$

which can also be written as follows:

$$\overline{(\delta r_{+1} - \delta r_{-1})(\delta r_{+1} + \delta r_{-1})} = \epsilon \quad (7)$$

Since the interval between samples is short with respect to the signaling period, it is possible to express $\delta r_{+1}$ and $\delta r_{-1}$ as follows:

$$\delta r_{+1} = r_{+1} - \overline{r_O} \quad (8)$$

$$\delta r_{-1} \simeq r_{-1} \overline{r_O} \quad (9)$$

where
$\overline{r_O}$ represents the mean value of the signal envelope at time $t_{act}$.

Therefore, equation (7) can be written as follows:

$$\overline{(r_{+1} - r_{-1})(r_{+1} + r_{-1} - 2\overline{r_O})} = \epsilon \quad (10)$$

Circuit 12 could be designed to compute the real value of $\epsilon$ but to simplify the solution, it is sufficient to have the circuit 12 determine the algebraic sign of $\epsilon$ and to have the output on line 12a modify the clock phase at each signaling instant by a small value in the direction tending to reduce $\epsilon$. Therefore, to obtain optimum signaling instant $t_{opt}$, the clock phase is adjusted so that $t_{act}$ is as close as is possible to $t_{opt}$, in accordance with the following algorithm.

$$\text{sign } \epsilon = \overline{\text{sign}(r_{+1} - r_{-1}) \times \text{sign}(r_{+1} + r_{-1} - 2\overline{r_O})} \quad (11)$$

A circuit using this algorithm is shown on FIG. 3.

It is also possible to calculate the error $\epsilon$ in another way which does not require the evaluation of $\overline{r_O}$. Values $\delta r_{+1}$ and $\delta r_{-1}$ are estimated as follows:

$$\delta r_{+1} = r_{+1} - r_{(+1-nT)} \quad (12)$$

$$\delta r_{-1} = r_{-1} - r_{(-1-nT)} \quad (13)$$

n being an integer and the phase adjustment algorithm to be used is as follows:

$$\text{Sign } \epsilon = \overline{\text{sign}(\delta r_{+1} - \delta r_{-1}) \times \text{sign}(\delta r_{+} + \delta r_{-})} \quad (14)$$

A circuit using this algorithm is shown on FIG. 4;

The embodiment of circuit 12 shown on FIG. 3 will be first described.

Circuit 12 of FIG. 3 receives, at its three inputs, 14a, 14b, and 14c, the three envelope samples $r_O$, $r_{+1}$, and $r_{-1}$ from gate 13.

Sample $r_O$ on input 14b is applied to an integrator 15 which provides mean value $\overline{r_O}$ at its output line 16. This integrator is comprised of a first multiplier 17 multiplying the input by a factor $\alpha$ a summing device 18, a delay circuit 19 and a second multiplier 20 having a multiplying factor of $(1+\alpha)$. Product $\alpha r_O$ provided by 17 is added by summing device 18 to the product by $(1-\alpha)$ of sample $\overline{r_O}$ from the preceding signaling instant. This product is provided by multiplier 20. The output from summer 18 is equal to the new $\overline{r_O}$.

Samples $r_{+1}$ and $r_{-1}$ on input lines 14a and 14c are added in a summing device 21. A multiplier 22 connected to line 16 provides product $2\overline{r_O}$. A subtractor 23 receives sum $r_{+1}+r_{-1}$ from summer 21 and product $2\overline{r_O}$ from multiplier 22 and provides the digital value of $(r_{+1}+r_{-1}-2\overline{r_O})$ on its output line 24.

A subtractor 25 receives samples $r_{+1}$ on its additive input and $r_{-1}$ on its subtractive input and provides the digital value of $(r_{+1}-r_{-1})$ at its output 26.

Two circuits 27 and 28 determine the algebraic signs of the expressions $(r_{+1}+r_{-1}-2\overline{r_O})$ and $(r_{+1}-r_{-1})$ on lines 24 and 26, respectively. These signs are multiplied by a multiplier 29 to obtain the sign of $\epsilon$ which is to be used as a control signal.

When the product from multiplier 29 is positive, this means that the sign of $\epsilon$, which represents $t_{act}-t_{opt}$, is positive and consequently, that the signaling instant as defined by the clock in the receiver follows the optimum signaling instant so that it is necessary to advance the phase of the receiver clock, i.e., to increase its frequency. Therefore, division ratio p of the oscillator is decreased in proportion.

Conversely, if the sign of $t_{act}-t_{opt}$ is negative, the division ratio is increased tp retard the phase of the clock.

This adjustment will be performed at each signaling time. Therefore, there will be an accumulation of corrections by the clock locking oscillator until the phase is substantially correct and thereafter, alternating corrections are made to maintain the phase at about the optimum value.

A second embodiment of the phase adjustment circuit 12 is shown in FIG. 4.

This circuit processes two envelope samples $r_{+1}$ and $r_{-1}$ provided by circuit 13 of FIG. 1.

A subtractor 30 receives samples $r_{+1}$ on its additive input and the sample $r_{(+1-nT)}$ preceding it by n signaling periods on its subtractive input. In this embodiment, n is chosen as equal to four. The sample $r_{(+1-4T)}$ is provided by delay circuit 31.

In the same way, a subtractor 32 receives sample $r_{-1}$ on its additive input and the sample $r_{(-1-T)}$ preceding it by 4 signaling periods on its subtractive input from a delay circuit 33.

The output of each of circuits 30 and 32 is applied to the inputs of a summing device 34 and to the additive and subtractive inputs, respectively, of a subtractor 35.

Outputs 36 and 37 of circuits 34 and 35 are applied respectively to sign circuits 38 and 39 which determine the signs of the digital representations of the values they receive. The outputs of circuits 38 and 39 are applied to the inputs of a multiplier 40 whose output on line 41 is applied to the receiver clock 11.

The following description relates to the operation of the circuit shown on FIG. 4. Subtractors 30 and 32, respectively, provide the digital values of $\delta r_{+1}$ and $\delta r_{-1}$ given in expressions (12) and (13).

Therefore, summing device 34 provides on line 36, the digital value of:

$$\delta r_{+1} + \delta r_{-1}.$$

Subtractor 35 provides on line 37, the digital value of:

$$(\delta r_{+1} - \delta r_{-1}).$$

The signs of the digital values $(\delta r_{+1}+\delta r_{-1})$ and $(\delta r_{+1}-\delta r_{-1})$ as determined by circuits 38 and 39 are applied to multiplier 40 which determines the sign of the product:

$$(\delta r_{+1} - \delta r_{-1})(\delta r_{+1} + \delta r_{-1}) = \text{sign } \epsilon$$

Therefore, the sign of $\epsilon$, which represents $(t_{act}-t_{opt})$ in accordance with expression (14), is provided on output line 41 of multiplier 40.

This information may be used to adjust the oscillator phase and frequency as previously described with reference to FIG. 3.

The following description relates to another embodiment of the invention in which the error signal $\epsilon$ is not obtained from the properties of the signal envelope but is derived from the phase properties.

Figure 5:
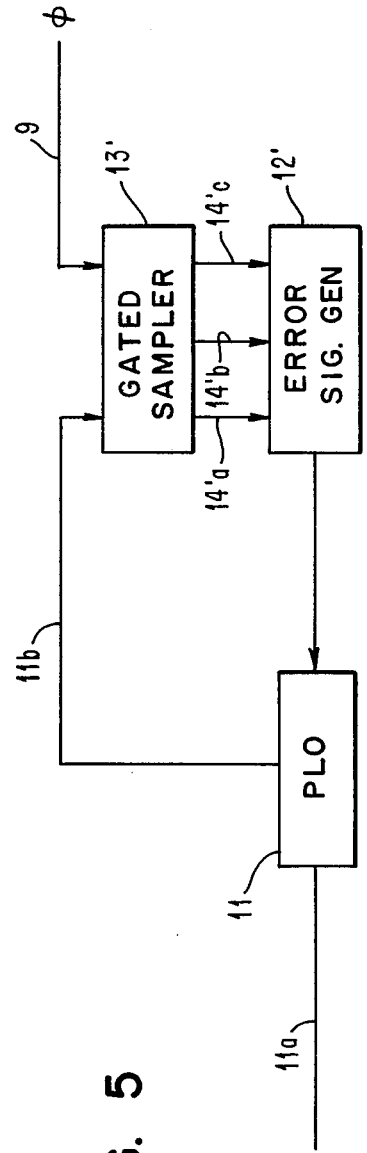
FIG. 5 shows a functional modification of part of the receiver of FIG. 1 to implement another embodiment of the invention.

FIG. 5 shows the construction of part 12, of the receiver which is to be used to obtain the error signal from the phase. According to this embodiment, the receiver also includes the same elements as the receiver shown on FIG. 1, i.e., a sampling circuit 8 controlled by oscillator 11, a convertor 4, a Hilbert transformer 5 and a resolver 8.

Phase information $\phi$ is provided on line 10 for each sample by the resolver 8 and is applied to gate 13' which makes a selection of three phase samples close to each signaling instant, which samples are applied, through lines 14'a, 14'b, and 14'c, to a circuit 12' which derives from said phase samples the error signal $\epsilon'$ is used to adjust oscillator 11.

Before proceeding to the description of circuit 12', it will be shown how the error signal can be obtained by processing the phase of the samples of the received signal.

The line signal in PSK modulation is shown above by expressions (1) and (2).

The signal phase is equal to:

$$\Phi(t) = \text{Arctan } \hat{x}(t)/x(t) \tag{15}$$

As in the signal envelope, the phase can vary according to the time but at each signaling instant, the phase of the received signal should be equal to a constant to which is added the phase value corresponding to the information being transmitted at this time.

Therefore, at each point of time coinciding with a signaling instant of the received signal, the variance of the nominal phase (cleared of the data) $\Phi$ is minimum, which can be written as follows:

$$\overline{\delta^2 \Phi'}(t) = \text{minimum}$$

The process used to compute the phase variance $\Phi'$ is the same as the one used to compute the envelope variance.

At each signaling instant $t_{act}$ defined by the receiver clock, the phase variance $\phi'$ is determined by processing two samples separated from the central sample by a sampling period $\tau$, one sample being taken from each side of the central sample $\Phi(t_{act})$. These two samples are called $\Phi_{+1}$ and $\Phi_{-1}$ and the central sample is called $\Phi_0$.

The measurement of the variance will be integrated over several periods and the clock phase will be corrected so that the variance becomes substantially null. At this time, the received signal will be properly sampled at a point coinciding with a signalling instant of the received signal. Circuit 12' computes a value of $\epsilon'$ in accordance with the expression:

$$\overline{(\delta\Phi'_{+1})^2} - \overline{(\delta\Phi'_{-1})^2} = \epsilon' \tag{16}$$

which can be also written as:

$$\overline{(\delta\Phi'_{+1} + \delta\Phi'_{-1})} \times \overline{(\delta\Phi'_{+1} - \delta\Phi'_{-1})} = \epsilon' \tag{17}$$

As previously described with respect to the processing of the signal envelope, the clock adjustment algorithm is as follows:

$$\text{sign } \epsilon' = \text{sign } [\delta\Phi'_{+1}+\delta\Phi'_{-1}] \times \text{sign} [\delta\Phi'_{+1}-\delta\Phi'_{-1}] \tag{18}$$

FIG. 6 shows a circuit used to determine the sign of $\epsilon'$, which is also the sign of $t_{act}-t_{opt}$ in accordance with formulae (18) given above, i.e., by processing the phase.

The circuit shown on FIG. 6 applies when DPSK modulation is used. With this type of modulation, the data are detected from the phase difference of the signal received at two successive signalling instants.

For each signaling instant as determined by the receiver clock, the three consecutive samples $\Phi_{-1}$, $\Phi_0$ and $\Phi_{+1}$ are supplied from gates 13 through lines 14a', 14b' and 14c' to circuit 12' shown in detail in FIG. 6.

Sample $\Phi_{-1}$ on line 14a' is applied to the additive input of a subtractor 42 and to the subtractive input of the subtractor 42 through a delay circuit 43 having a delay period of T. In the same way, sample $\Phi_{+1}$ on input 14c' is applied to the additive input of a subtractor 44 and to the subtractive input of the subtractor through a delay circuit 45 also having a delay of T.

Sample $\Phi_0$ on input 14b' is applied to one additive input of a subtractor 46 and to the subtractor input of the subtractor with a delay T through a delay circuit 47. A digital value corresponding to a reference phase, the value of which depends of the encoding in use and whose function will be described later, is applied to another additive input of circuit 46. For a better understanding of the invention, it is assumed that the four phase variation 0, $\pi/2$, $\pi$ and $3/2\pi$ correspond to the bit pairs 00, 01, 11 and 10 of the data characters to be transmitted and in this case, the reference value is $+\pi/4$. Therefore, circuit 46 will add this reference value to the phase difference between two samples $\Phi_0$ received at two successive signaling instants. Thus, the value provided by circuit 46 on its output line 48 in the case chosen for encoding the data, is centered in one of the four sectors, which makes data detection easier.

Output 48 of circuit 46 is connected to a data detection circuit 49. This circuit can be an AND circuit receiving on one of its inputs, the digital value of the phase on line 48 and on another input, a masking pattern comprised of a certain number of ones which depends on the character length and of a certain number of zeroes which depends on the number of digital bits provided for each sample by converter 4 of FIG. 1.

Outputs 50 and 51 of subtractors 42 and 44 are applied, respectively, to the additive inputs of two subtractors 52 and 53. The subtractive inputs of subtractors 52 and 53 are connected to output 54 of the data detection circuit 49.

Outputs 55 and 56 of subtractors 52 and 53 are applied to the inputs of a summing device 57 on one hand and additively and subtractively, respectively, to the inputs of a subtractor 58, on the other hand.

The outputs of circuits 57 and 58 are connected to an associated one of two circuits 59 and 60 which determine the algebraic sign of the output. The outputs of circuits 59 and 60 are applied to the inputs of a multiplier 61 whose output is the error signal $\epsilon'$.

The circuit shown on FIG. 6 operates as follows. Subtractors 42 and 44 provide the phase differences:

$$\Delta_{-1} = \Phi[t_{act} - \tau] - \Phi[t_{act} - (\tau - T)]$$

and $$\Delta_{+1} = \Phi[t_{act} + \tau] - \Phi[t_{act} + (\tau - T)],$$

respectively.

As these phase samples are taken close to the signaling instants, phase differences $\Delta\Phi_{-1}$ and $\Delta\Phi_{+1}$ represent variances $\delta\Phi'_{-1}$ and $\delta\Phi'_{+1}$ plus the data at instant $t_{act}$.

Therefore, to obtain $\delta\Phi'_{-1}$ and $\delta\Phi'_{+1}$ the phase data derived from phase samples $\Phi_0$ by circuits 46, 47, and 49 is subtracted from $\Delta\Phi_{-1}$ and $\Delta\Phi_{+1}$ in subtractors 52 and 53, respectively.

Therefore, the values of the expressions of $\delta\Phi'_{-1}$ and $\delta\Phi'_{+1}$ are, respectively, available at each signaling instant on output lines 55 and 56 of subtractors 52 and 53.

Accordingly, summing device 57 provides the value of $(\delta\Phi'_{+1} + \delta\Phi'_{-1})$ to its sign determining circuit 59 and subtractor 58 provides the value of $(\delta\Phi'_{+1} - \delta\Phi'_{-1})$ to its sign determining circuit 60.

Multiplier 61 provides the sign of product $$(\delta\Phi'_{+1} + \delta\Phi'_{-1})(\delta\Phi'_{+1} - \delta\Phi'_{-1})$$

at each signaling instant, which according to equation (18) gives an indication of the timing of $t_{act}$ with respect to $t_{opt}$. Consequently, the phase of clock 11 is modified at each signaling instant by varying the division ratio used in the oscillator 11.

In the circuit shown in FIG. 6, the data are encoded in DPSK mode. It is obvious that it is also possible to apply the principle used in this circuit when the data are encoded in CPSK mode. For this purpose, it is necessary to decode the data from sample $\Phi_0$ and to remove the effect of the data from samples $\Phi_{-1}$ and $\Phi_{+1}$ as described above. This embodiment will not be described in details since it will be obvious to those skilled in the art.

FIG. 7 shows the general scheme of an oscillator which can be used in the various embodiments of the invention. This oscillator includes a high frequency signal generator 62 connected to a divider 63, the division ratio of which can be controlled.

At every signaling instant, the sign of the quantity $(t_{act} - t_{opt})$ is determined by one of the circuits 12 or 12' as diagrammed in FIGS. 3, 4 or 6. If said sign is positive, the division ratio in divider 63 is increased by $+1$; if the sign is negative, the division ratio is decreased by 1. The adjustment will be performed at every signaling instant on the previously adjusted oscillator so that the oscillator accumulates the corrections and alternates in frequency and phase about the optimum value.

While the invention has been particularly shown and described with reference to three preferred embodiments thereof, it will be understood by those skilled in the art that numerous changes in form and detail may be made therein without departing from the spirit and scope of the invention as set forth in the appended claims.

What is claimed is:

1. A synchronizing process for adjusting the relative phase of a receiver clock whose output signals define the signaling instants of the signal received by the receiver of a synchronous digital data transmission system using PSK modulation, said process enabling the signaling instants to be the same relative to the received signal as the signaling instants defined in the transmitted signal, said process characterized in that it includes the following steps:

(a) measuring the variation $\delta X_{-1}$ of one of the characteristic parameters X of the received signal at an instant $t_{act}-\tau$, where $t_{act}$ is the signaling instant defined by the receiver clock and $\tau$ is a small given time interval;

(b) measuring the variation $\delta X_{+1}$ of parameter X on a second instant $t_{act}+\tau$;

(c) deriving from the measured values of variations $\delta X_{-1}$ and $\delta X_{+1}$, a signal $\epsilon$ according to the following expression:

$$\epsilon = \overline{(\delta X_{-1})^2} - \overline{(\delta X_{-1})^2}; \text{ and}$$

(d) applying signal $\epsilon$ to the receiver clock to adjust the phase of the clock signals in a direction to reduce the value of the magnitude of $\epsilon$.

2. A synchronizing process as set out in claim 1 and further characterized in that parameter X is the envelope r of the signal received by the receiver of the transmission system.

3. A synchronizing process as set out in claim 1 and further characterized in that parameter X is the nominal phase $\phi$ of the signal received by the receiver, that is the received signal modified by the removal of the phase component due to the transmitted data.

4. In a synchronizing device for adjusting the relative phase of a receiver clock whose output signals define the signaling instants of a signal received by the receiver of a synchronous digital data transmission system using PSK modulation, to adjust the signaling instants defined by the clock to be the same relative to the received signal as the signaling instants defined in the transmitted signal, the combination of:

a source of a data representing signal;

an adjustable receiver clock whose output signals define the signaling instants of said data representing signal;

a sampling device responsive to said receiver clock to derive a plurality of samples of said data representing signal, one sample being taken at the defined signaling instant and the remainder being taken at intervals of a multiple of a fixed time interval prior to and after said one sample;

a means on the output of said sampling device to resolve each sample into a number of parameters representing the sampled received signal;

a computing means connected to said resolving means to determine the variation of said received signal for at least the one sample proceeding and the one sample following said signaling instant and to determine a value $\epsilon$ from said variations; and means between said computing means and said receiver clock to adjust the phase of said clock in a direction which will reduce the magnitude of said value $\epsilon$.

5. In a synchronizing device for adjusting the phase of a receiver clock to be correlated with the signaling instants of a received signal, the combination of:

a source of data representing signal;

an adjustable receiver clock whose output signals define the signaling instants of said data represensing signal;

a sampling device responsive to said receiver clock and to said signal to derive at least three samples of said signal, one sample being at the defined signaling instant, a second sample being before said first sample by an interval $\tau$ and a third sample being after said first sample by said interval $\tau$;

a resolver connected to said sampling device to generate a factor r of the signal envelope of said received signal for each of said three samples;

means connected to said resolver for computing an adjustment signal $\epsilon$ from said three factors $r_{-1}$, $r_0$, and $r_{+1}$ for said samples of the envelope of the received signal, $r_{-1}$, being the factor of said sample at instant $t_{act} - \tau$, $r_0$ being the factor of said sample at instant $t_{act}$ and $r_{+1}$ being the factor of said sample at instant $t_{act} + \tau$ according to the following expression:

$$\epsilon = \overline{(\delta r_{-1})^2} - \overline{(\delta r_{-1})^2} = \overline{(r_{+1} - r_{-1})} \cdot \overline{(r_{+1} + r_{-1} - 2\bar{r}_0)}; \text{ and}$$

means connected thereto to transmit said adjusting signal to said receiver clock to vary the phase of the signal provided by the clock in a correlated direction until the algebraic sign of signal $\epsilon$ changes.

6. A synchronizing device as set out in claim 5 characterized in that said means provided for computing the adjustment signal includes:

an integrator receiving sample $r_0$ from said resolver and acting to compute a mean value $\bar{r}_0$;

a multiplier receiving the output signal from said integrator and acting to multiply it by 2 to compute $2\bar{r}_0$;

a first summing device connected to said resolver to receive the factors $r_{-1}$ on one of its inputs and $r_{-1}$ on its other input;

a first subtracting device connected to receive the output of the multiplier by 2 on the subtractive one of its inputs and the output of the first summing device on its second input;

a second subtracting device connected to said resolver to receive factor $r_{-1}$ on the additive one of its inputs and factor $r_{-1}$ on its subtractive input to generate the term $(r_{-1} - r_{-1})$; and means to generate the value $\epsilon$ from the outputs of said two subtacting devices.

7. A synchronizing device according to claim 6 and further characterized in that said means to generate the value of $\epsilon$ includes:

a means connected to said first subtraction device for determining the algebraic sign of the quantity $(r_{-1} + r_{-1} - 2\bar{r}_0)$ from said samples at each signaling instant $t_{act}$;

a second means connected to said second subtracting device for determining the sign of $(r_{-1} - r_{-1})$;

a multiplier means connected to both said sign determining means to determine the algebraic sign of $\epsilon$; and a connection from the output of said multiplier means to said receiver clock.

8. In a synchronizing device for adjusting the phase of a receiver clock for correlation with the signaling instants of a received signal, the combination of:

a source of a data representing signal;

an adjustable receiver clock whose output signals define the signaling instants of said data representing signal;

a sampling device responsive to said receiver clock and two of said signals to derive at least two samples of said signal, a first of said samples being taken at a time interval $\tau$ prior to said signaling instant and the other of said samples being taken at said time interval $\tau$ after said signaling instant;

a resolver connected to said sampling device to generate a factor r of the signal envelope of said received signal for each of said samples;

means connected to said resolver for computing in accordance with the following expression, an adjustment signal $\epsilon$ from said two samples $r_{-1}$ and $r_{+1}$ of the envelope of the received signal, where $t_{act}$ is the signaling instant and $\tau$ is a fixed short interval, $r_{-1}$ being the sample at an instant $t_{act}-\tau$ and $r_{+1}$ being the sample at an instant $t_{act}+\tau$:

$$\epsilon = \overline{(\delta r_{+1})^2} - \overline{(\delta r_{-1})^2} = \overline{(\delta r_{+1} - \delta r_{-1})} \times \overline{(\delta r_{+1} + \delta r_{-1})};$$

and means connected to the output of said computing means to apply said adjustment signal $\epsilon$ to said receiver clock to vary in a correlated direction the phase of the signals provided by the clock until the algebraic sign of signal $\epsilon$ changes.

9. A synchronizing device as set out in claim 8 characterized in that said means for computing an adjustment signal $\epsilon$ includes:
- a first means connected to receive said $r_{+1}$ factors from said resolver to compute the term $\delta r_{+1}$ by determining the difference between two samples $r_{+1}$ separated in time by a multiple of T, T being the signaling period;
- a second means also connected to said resolver to receive said $r_{-1}$ factors to compute the term $\delta r_{-1}$ by determining the difference between two samples $r_{-1}$ separated in time by the same multiple of T;
- a summing device connected to the output of said first means computing $\delta r_{+1}$ on one of its inputs and to the output of said second means computing $\delta r_{-1}$ on its other input;
- a subtracting device connected to the output of said first means on one of its inputs and to the output of said second means on its other input; and
- devices connected to said summing and subtracting devices to generate the adjustment signal $\epsilon$.

10. A synchronizing device as set out in claim 9 characterized in that said devices to generate the adjustment signal $\epsilon$ include:
- a first sign means for determining the algebraic sign of the term $(\delta r_{+1} + \delta r_{-1})$ provided by said summing device;
- a second sign means for determining the algebraic sign of the term $(\delta r_{+1} - \delta r_{-1})$ provided by said subtracting device; and
- a multiplier means connected to said two sign means to determine the sign of the product of said signs for transmittal to said receiver clock as the adjustment signal $\epsilon$.

11. In a synchronizing device for adjusting the phase of a receiver clock to be correlated with the signaling instants of a received signal, the combination of:
- a source of a data representing signal;
- an adjustable receiver clock whose output signals define the signaling instants of said data representing signal;
- a sampling device responsive to said receiver clock and to said signal to derive at least three samples of said signal, one sample being at the defined signaling instant $t_{act}$, a second sample being taken prior to said first sample by a fixed time interval $\tau$, and a third sample being taken after said signaling instant by said fixed time interval $\tau$;
- a resolver connected to said sampling device to generate for each sample a factor $\Phi$, representing the phase of said received signal at the time of said sample;
- means connected to said resolver for computing an adjustment signal $\epsilon$ from said three factors $\Phi_{-1}$, $\Phi_0$, and $\Phi_{+1}$ of said samples of the received signal, said means including devices to determine the nominal phase $\Phi'$ of the carrier signal of said system prior to data modulation thereof for each of said second and third samples and devices to determine signal $\epsilon$ from said nominal phases according to the expression $$\epsilon = \overline{(\delta\Phi'_{+1} + \delta\Phi'_{-1})} \times \overline{(\delta\Phi'_{+1} - \delta\Phi'_{-1})}; \text{ and}$$

circuits to apply said adjustment signal $\epsilon$ to said receiver clock to change the phase thereof in a direction to reduce the magnitude of signal $\epsilon$.

12. A synchronizing device as set out in claim 11 characterized in that said means for computing the adjustment signal $\epsilon$ includes:
- a data detector to determine from factor $\Phi_0$ the data symbol represented by the received signal;
- a first means connected to said data detector and to said resolver to determine factor $\delta\Phi'_{-1}$ by computing the difference between two samples $\Phi_{-1}$ separated in time by a signaling period T and by subtracting the data provided by the detector from this difference;
- a second means connected to said data detector and to said resolver to determine factor $\delta\Phi'_{+1}$ by computing the difference between two samples $\Phi_{+1}$ separated in time by a signaling period T and by subtracting the data provided by the detector from this difference;
- a summing device connected to said first and second means and receiving factor $\delta\Phi'_{-1}$ computed by the first means on one of its inputs and factor $\delta\Phi'_{+1}$ computed by the second means on another input to generate the value $(\delta\Phi'_{+1} + \delta\Phi'_{-1})$;
- a subtracting device also connected to said first and second means and receiving factor $\delta\Phi'_{+1}$ computed by the second means on the additive one of its inputs and factor $\delta\Phi'_{-1}$ computed by the first means on its subtractive input to generate the value $(\delta\Phi'_{+1} - \delta\Phi'_{-1})$; and
- means on the outputs of said summing and said subtracting means to generate said signal $\epsilon$.

13. A synchronizing device as set out in claim 12 further characterized in that said means to generate the adjustment signal $\epsilon$ includes:
- a means on the output of said summing device for determining the algebraic sign of the term $(\delta\Phi'_{+1} + \delta\Phi'_{-1})$;
- a means on the output of said subtracting device for determining the algebraic sign of the term $(\delta\Phi'_{+1} - \delta\Phi'_{-1})$; and
- a product means connected to said two sign determining means to develop the algebraic sign of the product of said signs as the adjustment signal $\epsilon$.

* * * * *

UNITED STATES PATENT AND TRADEMARK OFFICE
CERTIFICATE OF CORRECTION

PATENT NO. : 4,137,427
DATED : January 30, 1979
INVENTOR(S) : M. Choquet et al

It is certified that error appears in the above-identified patent and that said Letters Patent are hereby corrected as shown below:

In the below-listed places, change "-" to -- + --:

Column 11, claim 1, line, line 1, first occurrence;

Column 12, claim 5, line 4, first occurrence;
 claim 6, line 21, first occurrence; line 28, line 30, first occurrence; claim 7, line 38, first occurrence, line 41, first occurrence.

Signed and Sealed this

Eighth Day of May 1979

[SEAL]

Attest:

RUTH C. MASON
Attesting Officer

DONALD W. BANNER
Commissioner of Patents and Trademarks